United States Patent

O'Brien et al.

[11] 3,888,446
[45] June 10, 1975

[54] POLE MOUNTING BRACKET ATTACHMENT

[75] Inventors: Dennis H. O'Brien, Omaha; Dennis D. Havranek, Fremont, both of Nebr.

[73] Assignee: Valmont Industries Inc., Valley, Nebr.

[22] Filed: Apr. 2, 1974

[21] Appl. No.: 457,202

[52] U.S. Cl. .................. 248/231; 248/70; 403/392
[51] Int. Cl. .................... F16b 7/00; B65d 63/08
[58] Field of Search .......... 248/231, 230, 228, 229, 248/70, 221; 24/81 CR, 286, 276, 277; 403/385, 392, 400

[56] References Cited
UNITED STATES PATENTS

| | | | |
|---|---|---|---|
| 538,054 | 4/1895 | Traphagen | 403/385 |
| 1,413,818 | 4/1922 | Wilkinson | 24/277 |
| 1,706,215 | 3/1929 | Davidson | 403/385 X |
| 2,755,054 | 7/1956 | Churella | 248/231 X |
| 3,347,505 | 10/1967 | Menser | 248/229 X |
| 3,559,941 | 2/1971 | Holzman | 248/231 X |
| 3,749,429 | 7/1973 | Hauber | 403/385 |

*Primary Examiner*—J. Franklin Foss
*Attorney, Agent, or Firm*—Kinzer, Plyer, Dorn & McEachran

[57] ABSTRACT

A bracket for mounting a traffic signal or like device on a pole falling within a given diameter range, comprising a flat steel plate, cut and bent to form two pole-engaging wedges extending angularly from one plate surface and having a series of rounded retainer flanges on the opposite side of the plate, and a flexible cable looped around one retainer flange; the free ends of the cable extend around the pole to the wedge side of the plate and are bolted to the plate.

7 Claims, 6 Drawing Figures

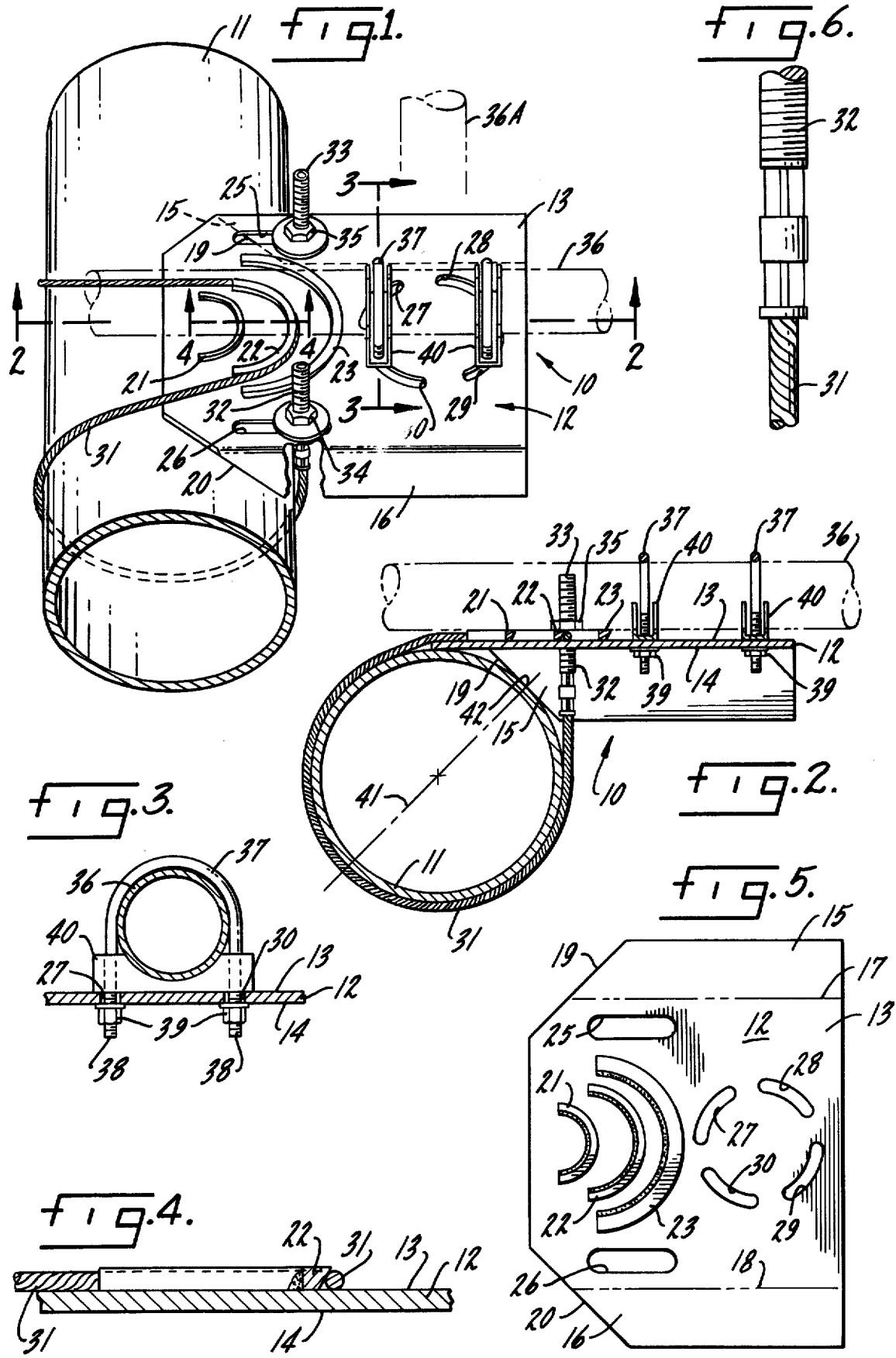

POLE MOUNTING BRACKET ATTACHMENT

BACKGROUND OF THE INVENTION

A variety of different kinds and types of brackets have been proposed and used for mounting traffic signals, luminaires, signs, and other devices on poles. Many of these mounting brackets fit only one particular pole size or configuration. The traffic signal or other device is usually supported on an extension arm that projects outwardly from the pole; for many of the previously known bracket constructions, the extension arm is held at a fixed angle so that the bracket is not suitable for applications in which a different mounting angle is required.

Other bracket constructions have been proposed that are of more general application. However, these bracket structures have usually included complex castings or other expensive or complex components, particularly when the bracket is to be utilized with poles of substantially different sizes, with tapered poles, or with poles of unusual cross-sectional configuration. Moreover, the mounting devices employed for adjustable angle mounting of the extension arms, in brackets of this nature, are often relatively complex and expensive in construction.

SUMMARY OF THE INVENTION

It is a principal object of the present invention, therefore, to provide a new and improved bracket attachment for mounting a luminaire, traffic signal, or other device on a pole, which is simple and inexpensive in construction yet is adapted for use with poles of substantially varying size and configuration.

A more specific object of the invention is to provide a new and improved pole mounting bracket attachment, suitable for use with luminaires, traffic signals, and like devices, in which the main body of the bracket is formed by simple bending and punching operations performed on a flat metal plate, no castings or forgings being required in the fabrication of the bracket.

A related object of the invention is to provide a new and improved pole mounting bracket attachment of the kind discussed above that permits convenient and rapid adjustment of the mounting angle of an extension arm on the bracket, over a substantial angular range.

A specific object of the invention is to provide a new and improved pole mounting bracket attachment for luminaires, traffic signals, and like devices that consists essentially of a flat steel plate on which limited punching and bending operations have been performed, a flexible mounting cable, and a limited number of ordinary bolt fasteners.

Accordingly, the invention is directed to a bracket attachment for mounting a luminaire, traffic signal, or other device on a pole, and is adapted for use with poles in a range of varying diameters. The bracket attachment comprises a flat mounting plate having two pole-engaging wedge elements formed integrally with the plate and bent from the plane of the plate to project outwardly of the obverse surface of the plate. AT least one retainer flange is affixed to the mounting plate and projects outwardly of the reverse surface of the mounting plate. A flexible retainer member, preferably a cable of high tensile strength, is looped around the retainer flange; the two free ends of the retainer member extend around a pole from the reverse surface of the mounting plate to its obverse surface. Adjustable fastening means are provided for securing the free ends of the retainer member to the mounting plate and affix the mounting plate to the pole, tightening of the adjustable fastening means serving to draw the wedge elements into engagement with the pole, with one end of the mounting plate projecting outwardly from the pole in approximately tangential relation thereto. The bracket attachment further comprises adjustable device mounting means for mounting a device on the projecting end of the mounting plate, at any mounting angle within a substantial angular range and within a substantial displacement range relative to the mounting plate.

BRIEF DESCRIPTION OF THE DRAWINGS

FIG. 1 is a perspective view, looking upwardly, of a pole mounting bracket attachment constructed in accordance with a preferred embodiment of the present invention, shown mounted on a tapered pole;

FIG. 2 is a bottom sectional view of the pole mounting bracket attachment of FIG. 1 taken approximately along line 2—2 in FIG. 1;

FIG. 3 is a detail sectional view, drawn to an enlarged scale, taken approximately along line 3—3 in FIG. 1;

FIG. 4 is a detail sectional view, drawn to an enlarged scale, taken approximately along line 4—4 in FIG. 1;

FIG. 5 is a plan view of the main mounting plate of the bracket attachment of FIG. 1 at a preliminary stage of manufacture; and FIG. 6 is a detail view of one of the cable-end mounting bolts used in the bracket attachment of FIGS. 1 and 2.

DESCRIPTION OF THE PREFERRED EMBODIMENT

FIGS. 1 and 2 illustrate a bracket attachment 10, constructed in accordance with a preferred embodiment of the present invention, that may be utilized for mounting a luminaire, a traffic signal, a sign, or other like device on a pole 11. The bracket attachment 10 is intended for use with poles that fall within a relatively broad range of different diameters. As illustrated, pole 11 is in the middle of the range of pole sizes with which the bracket attachment 10 is usable; both larger and smaller pole sizes could be accommodated. The illustrated pole 11 is of tapered construction, but the bracket attachment 10 can also be used on untapered poles. Furthermore, the bracket attachment 10 is not limited to a pole of circular cross-sectional configuration, such as pole 11, but can be used with oval poles and other shapes.

A principal component of the bracket attachment 10 is a flat mounting plate 12, preferably formed of steel plate no thicker than one-quarter inch. FIG. 5 shows mounting plate 12 in a preliminary stage of manufacture. The surface 13 of plate 12 shown in FIGS. 1 and 5 is the reverse surface of the plate, the reverse surface being defined as the side surface of the plate that is positioned away from pole 11 when bracket attachment 10 is mounted on the pole (see FIG. 2). For purposes of this specification, the obverse surface of plate 12 is defined as the surface adjacent pole 11 when bracket attachment 10 is mounted on the pole, this being the surface 14 (FIG. 2).

As seen in FIGS. 1 and 5, the opposite sides of mounting plate 12 are angularly cut to form two pole-engaging wedge elements 15 and 16. The one side of plate 12 is bent from the plane of the plate from the position shown in FIG. 5, at an angle of approximately 90° along a bend line 17, so that wedge element 15 projects outwardly of the obverse surface 14 of the plate as seen in FIG. 2. Similarly, the other side of plate 12 is bent at an angle of approximately 90°, along a bend line 18 (FIG. 5), to project outwardly of the obverse surface of the mounting plate. In the finished form of mounting plate 12, the wedge element 15 affords a pole-engaging surface 19 extending at an angle of approximately 45° to the obverse surface 14 of mounting plate 12 (FIG. 2). The corresponding pole-engaging surface of the other wedge element 16 is the surface 20 (FIG. 5).

Three retainer flanges 21, 22 and 23 are affixed to the mounting plate 12; each of the retainer flanges 21–23 projects outwardly of the reverse surface 13 of the mounting plate. Flanges 21–23 are preferably of arcuate configuration, as illustrated. These retainer flanges could be formed by blanking out segments of mounting plate 12 and bending those segments outwardly of the reverse surface 13. In the preferred construction, as illustrated, however, each of the retainer flanges 21–23 is formed as a short half-segment of ordinary pipe, chamfered at the outer edge and welded to the reverse surface 13 of plate 12. In a typical construction, flange 21 is formed from 2½ inch pipe, flange 22 from 3½ inch pipe, and flange 23 from 5 inch pipe.

Two retainer apertures 25 and 26 are formed at the opposite sides of plate 12, adjacent the retainer flanges 21–23. In addition, four arcuate device mounting apertures 27, 28, 29 and 30 are formed in plate 12. These mounting apertures 27–30 are located in the end of plate 12 that projects outwardly from pole 11 when attachment 10 is in its position of use (FIG. 1) and constitute a part of a mounting means for mounting a luminaire, traffic signal, or other like device (not shown) on plate 12.

Bracket attachment 10 further comprises a flexible retainer member 31. The retainer member 31 could constitute a chain or even a flexible strap. In the preferred construction illustrated in the drawings, however, the flexible retainer 31 is formed from a cable of high tensile strength. Aircraft cable is particularly suitable for retainer member 31; a specific cable of this type that affords superior use characteristics is the kind designated at 3/16 inch diameter 7–19 galvanized aircraft cable. A tubular retainer bolt 32 is swedged to or otherwise mounted on one free end of retainer cable 31 (FIG. 6) and a similar retainer bolt 33 is affixed to the opposite end of cable 31.

In mounting the bracket attachment 10 on pole 11, the central portion of the flexible retainer member 31 is looped around one of the three retainer flange 21–23. In FIGS. 1 and 2, cable 31 is shown looped around retainer flange 22. One end of cable 31 is extended around pole 11 from the reverse surface 13 of mounting plate 12 to the obverse surface 14 of the mounting plate. The retainer bolt 32 on this end of cable 31 is then inserted through the retainer bolt aperture 26 in plate 12 and a washer and a retainer nut 34 are mounted on the bolt. It is thus seen that bolt 32 and nut 34, in conjunction with the aperture 26 in plate 12, afford an adjustable fastening means for securing one free end of retainer member 31 to mounting plate 12. Similarly, the opposite end of cable 31 is wrapped around pole 11 and the bolt 33 on this end of the retainer cable is inserted through the retainer aperture 25 in plate 12 (FIG. 1). The adjustable fastener means for this end of retainer member 31 is completed by a suitable washer and a retainer nut 35. The two nuts 34 and 35 of the adjustable fastening means for the retainer member 31 are tightened to draw the wedge elements 19 and 20 into engagement with the pole 11 (see FIG. 2), thus mounting plate 12 on pole 11 with one end of the plate projecting outwardly from the pole in approximately tangential relation thereto as shown in FIG. 2. This affords a rigid and secure clamping action firmly affixing bracket attachment 10 to a pole 11 at virtually any desired position along the length of the pole.

The mounting apertures 27–30, which are formed in an annular array in the projecting portion of the mounting plate 12, constitute a part of a device mounting means for mounting an extension arm 36 at varying angular orientations relative to the mounting plate 12 and the pole 11; the illustrated construction allows a range of +3° to −24° from either horizontal or vertical alignment, assuming pole 11 is truly vertical. Arm 36 is secured to plate 12 by two U-bolt clamps 37 each including a base 40 from which two threaded ends 38 project. The bolt ends 38 are inserted through two of the mounting apertures, such as the apertures 27 and 30, as shown in FIG. 3. As will be readily apparent from FIGS. 1 and 3, it is a simple matter to loosen the nuts 39 on bolts 37 and rotate extension arm 36 to any desired angular orientation within the available range defined by slots 27–30, subsequently tightening nuts 39 to affix arm 36 to plate 12 at the desired mounting angle. A near horizontal orientation for arm 36 is shown in FIG. 1; a vertical orientation is indicated at 36A.

In FIGS. 1–3, the extension arm 36 that is utilized to mount a luminaire, traffic signal, or similar device on mounting bracket 10 is shown as a conventional pipe of circular cross-sectional configuration. This kind of extension arm is most frequently used, and 1½ inch pipe is a common size employed for arm 36. However, pipes of different sizes can be employed with the illustrated device mounting means, comprising muffle clamps 37 and mounting apertures 27–30. Moreover, this simple mounting arrangement is readily usable with extension arms of varying cross-sectional configuration. The illustrated arrangement of the mounting apertures 27–30 allows rotation of arm 36 through a total angle of approximately 27° from either a horizontal or vertial alignment and is particularly useful in that it permits accurate vertical or horizontal alignment on poles which are themselves not precisely aligned in either a horizontal or a vertical direction.

As clearly shown in FIGS. 1 and 2, the retainer cable 31 engages more than 180° of the periphery of pole 11 essentially centered about a diameter 41 extending through the point of contact 42 with each of the wedge surfaces such as wedge surface 19. Wedge elements 15 and 16 need not be formed at the outer side edges of mounting plate 12, as illustrated; the wedge elements can be blanked from and bent outwardly of a more central portion of the mounting plate. With only moderate tightening of nuts 34 and 35 (e.g., 20 foot-pounds of torque with 5/8 inch-11 UNC bolts), a firm and rigid clamping action is obtained, securely mounting bracket attachment 10 on pole 11.

Bracket attachment 10 can easily be constructed to accommodate changes in diameter of pole 11 over a range of several inches; thus, bracket attachments constructed in accordance with the invention can be utilized to mount two or more devices on a tapered pole at widely separated points or can be used in conjunction with individual poles of quite different diameters, eliminating any necessity for several models or sizes of bracket attachment. Bracket attachment 10 is also highly useful for hanging traffic signals on support arms of varying diameter.

As used in this specification, the term "pole" is intended to apply to any elongated pole-like support member, whether mounted vertically, horizontally, or at any other angle to the ground. A somewhat different angle for the wedge surfaces 19, 20 may be necessary for some pole shapes (i.e., square, hexagonal) but the illustrated construction is usable without change on round, oval, and many multi-sided pole configurations. Axial adjustment of the extension arm 36 is easily accomplished through the same technique as used for angular adjustment, affording a substantial displacement range lilmited only by the length of arm 36.

We claim:

1. A bracket attachment for mounting a luminaire, traffic signal, or other device on a pole, adapted for use with poles in a range of varying diameters, comprising:
    a flat mounting plate having two pole-engaging wedge elements formed integrally with the plate and bent from the plane of the plate to project outwardly of the obverse surface of the plate;
    at least one retainer flange affixed to the mounting plate and projecting outwardly of the reverse surface of the mounting plate;
    a flexible retainer member looped around the retainer flange, the two free ends of the retainer member extendable around a pole from the reverse surface of the mounting plate to the obverse surface of the plate;
    adjustable fastening means for securing the free ends of the retainer member to the mounting plate to affix the mounting plate to a pole, tightening of the adjustable fastening means serving to draw the wedge elements into engagement with the pole, with one end of the mounting plate projecting outwardly from the pole in approximately tangential relation thereto;
    and adjustable device mounting means for mounting a device on the projecting end of the mounting plate, at any mounting angle within a substantial angular range, and within a substantial displacement range relative to the mounting plate.

2. A pole mounting bracket attachment according to claim 1, including a plurality of spaced retainer flanges for use with overlapping pipe size ranges.

3. A pole mounting bracket attachment, according to claim 1, in which each retainer flange comprises a short pipe segment welded to the reverse surface of the mounting plate.

4. A pole mounting bracket attachment, according to claim 1, in which the fastening means comprises two bolts, affixed to the free ends of the retainer member, which extend through openings in the opposite sides of the mounting plate.

5. A pole mounting bracket attachment, according to claim 1, in which each wedge element includes a pole-engaging surface extending at an angle of approximately 45° to the obverse surface of the mounting plate.

6. A pole mounting bracket attachment, according to claim 1, in which the wedge elements are formed from the outer side edge portions of the mounting plate.

7. A pole mounting bracket attachment, according to claim 1, in which the device mounting means comprises a series of mounting apertures, formed in an annular array in the projecting portion of the mounting plate, to allow mounting of the device at any desired angular orientation relative to the mounting plate.

* * * * *